United States Patent
Reynard et al.

[11] 3,948,820
[45] Apr. 6, 1976

[54] CURABLE POLYPHOSPHAZENE COPOLYMERS AND TERPOLYMERS

[75] Inventors: Kennard A. Reynard, Mentor; Selwyn H. Rose, Beachwood, both of Ohio

[73] Assignee: Horizons Incorporated, Cleveland, Ohio

[22] Filed: Aug. 7, 1974

[21] Appl. No.: 495,464

Related U.S. Application Data

[63] Continuation of Ser. No. 303,159, Nov. 2, 1972, abandoned.

[52] U.S. Cl. ..... 260/2 P; 260/77.5 CH; 260/78.4 D; 423/300; 423/302
[51] Int. Cl. ............................................. C08g 33/16
[58] Field of Search ...................... 260/2 P; 423/302

[56] References Cited
UNITED STATES PATENTS

| | | | |
|---|---|---|---|
| 2,866,773 | 12/1958 | Redfarn | 260/2 P |
| 3,108,989 | 10/1963 | Rice et al. | 260/2 P |
| 3,313,774 | 4/1967 | Rice et al. | 260/2 P |
| 3,450,799 | 6/1969 | Kober et al. | 260/2 P |
| 3,591,530 | 7/1971 | Sollberger et al. | 260/2 P |

*Primary Examiner*—Wilbert J. Briggs, Sr.
*Attorney, Agent, or Firm*—Lawrence I. Field

[57] ABSTRACT

Copolymers and terpolymers comprising randomly repeating units represented by the general formulae

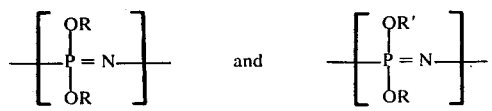

wherein the R' radicals contain OH functionality and R being at least one member of the group of monovalent radicals selected from alkyl, substituted alkyl, aryl, substituted aryl and arylalkyl, and R' is represented by

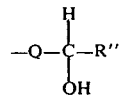

wherein Q represents either $-(CH_2)_n-$ or $-C_6H_4X(CH_2)_m-$, the $-X(CH_2)_m-$ group being either meta or para and $n$ is an integer from 1 to 6, $m$ is an integer from 1 to 3, X is O or $CH_2$, and R'' is H or a lower alkyl radical with up to four carbon atoms (methyl, ethyl, etc.). The ratio of R to R' is between 99.5 to 0.5 and 65 to 35.

11 Claims, No Drawings

CURABLE POLYPHOSPHAZENE COPOLYMERS AND TERPOLYMERS

The invention described herein was made in the performance of work under a NASA contract and is subject to the provisions of Section 395 of the National Aeronautics and Space Act of 1958, Public Law 85-568 (72 Stat 435; 42 U.S.C. 2457).

This is a continuation of application Ser. No. 303,159, filed Dec. 2, 1972, and now abandoned.

This invention relates to polymers containing repeating

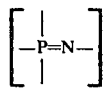

units in the polymer chain. More particularly it relates to polyphosphazene copolymers and terpolymers which contain —OH functionality attached to an organic radical which is boned to phosphorus.

The invention is applicable to the polyphosphazene homopolymers described in U.S. Pat. No. 3,370,020 (Allcock et al) issued Feb. 20, 1968, and in Polymer, 11, 31 (1970), to the poly(fluoralkoxyphosphazene) elastomers described in U.S. Pat. No. 3,515,688 (Rose) issued June 2, 1970, to the polyphosphazene copolymers and terpolymers described in pending U.S. Pat. Nos. 3,702,833 and 3,700,629, and Polymer, 13, 253 (1972), and to other polymers characterized by a repeating sequence of

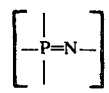

units in which various groups are attached to the P atoms, such groups including alkoxy, fluoroalkoxy, aryloxy, substituted aryloxy, and other groups. Suitable substituents on the phenoxy ring include halogen, nitro, cyano, phenyl, phenoxy and alkoxy. Other homopolymers and copolymers to which this invention is applicable are described in Chem. Rev., 72, 315 et seq. (1972).

The poly(fluoroalkoxyphosphazene) copolymers of U.S. Pat. 3,515,688 and the terpolymers of U.S. Pat. No. 3,702,833 have been crosslinked. However, cures which involved radical formation generally at elevated temperatures were employed. In contrast, the polymers of this invention can be crosslinked at room temperature without the necessity of a free radical source. By incorporation of a reactive —OH site as described herein, a controlled cure of these compositions is possible.

The polymers described in the prior art had structures of the type:

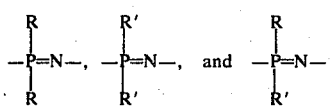

where R = R' for homopolymers but not for copolymers and R and R' are selected from alkoxy, substituted alkoxy, aryloxy, substituted aryloxy and arylalkoxy.

The polymers of this invention contain small amounts of randomly distributed repeating units in addition to the repeating units described above. The polymers of this invention have a degree of polymerization of 10 to 50,000. Examples of the additional repeating units are:

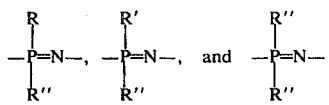

wherein R and R' are defined as described as above and R'' represents an organic monovalent radical containing a group with —OH functionality which is capable of further reaction at relatively moderate temperature represented by the formula

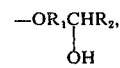

where $R_1$ is a divalent organic radical represented by —$(CH_2)_n$ or —$C_6H_4X(CH_2)_m$, the —$X(CH_2)_m$ group being either meta or para, and $R_2$ is H or a monovalent lower alkyl radical with up to four carbon atoms and $n$ is an integer from 1 to 6, $m$ is an integer from 1 to 3, and X is O or $CH_2$.

The ratio of (R and R') groups to R'' groups is between 99.5/0.5 and 65/35. Lower molecular weight polymers require higher concentrations of R'' groups for subsequent crosslinking; whereas higher molecular weight polymers require much smaller concentrations of R''.

Optimization of physical and chemical properties of polymers can generally be accomplished by crosslinking reactions. When crosslinked, the polymers of this invention are useful as solvent- and chemical-resistant coatings, sealants, potting compounds, elastomers and plastics. They are particularly suited to applications where flame retardancy is desirable. The polymers of this invention contain hydroxyl sites and can be crosslinked by a variety of chemical agents, including those that contain at least two isocyanate or anhydride sites per molecule. The presence of a catalyst to achieve a cure is often desirable.

In one process for the preparation of the polymers of this invention poly(dichlorophosphazene) is dissolved in a suitable solvent such as benzene, toluene, xylene, chlorobenzene, o-dichlorobenzene, tetrahydrofuran or mixtures thereof. This polymer solution is gradually added to a well stirred solution or suspension of alkoxide salt(s), e.g. as described in U.S. Pat. No. 3,515,688. If preferred, the salt(s) may be added to the solution of poly(dichlorophosphazene). Sodium alkoxides are normally employed but lithium or potassium salts are also suitable. The salts should be present in excess. The total mole percent of salts is preferably in the range 105 to 200 percent based on equivalents of chlorine originally present in the poly(dichlorophosphazene). The alkali salts derived from such alcohols or diols as trifluoroethanol, 2,2,3,3,3-pentafluoropropanol, 2,2,3,3,4,4,4-heptafluorobutanol, 2,2,3,3,-tetrafluoropropanol, 2,2,3,3,4,4,5,5-octafluoropentanol, 2,2,3,3,4,4,5,5,6,6,7,7-dodecafluoroheptanol, 2,2,3,3,4,4,5,5,6,6,7,7,8,8,8-pentadecafluorooctanol, 1,2-propanediol, 1,3-butanediol, 1,5-hexanediol, 1,2- hexanediol, 2-(m-hydroxyphenoxy)ethanol, ethylene glycol, 1,3-propanediol, and 1,4-butanediol, methanol, n-butanol, n-octanol, 2-methoxyethanol, 2-(n-butoxy)ethanol, phenol, 3- or 4-chlorophenol, 4-bromophenol, 4-methoxyphenol, 4-(n-butoxy)phenol, 4-phenylphenol, 4-phenoxyphenol, and benzyl alcohol may be employed. Other alcohols that can be used will be obvious to those skilled in the art.

Reaction temperatures in the range of 0° to 200°C. are useful, but the range of 20° to 150°C is preferred. The reaction is essentially complete when there is no change in the concentration of alkoxide reactant with reaction time.

Another method by which the above polymers may be prepared is as follows: a poly(phosphazene)-homopolymer or copolymer is reacted with the alkali salt of glycol. The hydroxyalkoxy moiety is introduced onto the phosphazene polymer in amounts from 0.5 up to 35 mole percent.

Polymers prepared by either of the two aforementioned processes may be isolated by known procedures. They may be formulated into crosslinkable systems with isocyanate or anhydride reagents by physical or by solution techniques. Catalysts may also be present to accelerate the curing reaction. Tertiary amines such as trialkylamines, triethylenediamine N-alkylated derivatives of piperidine, morpholine or piperazine, and 2,4,6-tris(N,N-dimethylaminomethyl)phenol, metal salts, and metal alkylhalides are representative of suitable catalysts. The amount of catalyst used is generally 0.1 to 5% by weight on polyphosphazene.

The following curing agents are representative of those found suitable for the curing of the polymers of this invention:

A. diisocyanates
   1-chloro-2,4-phenylene diisocyanate
   m-phenylene diisocyanate
   p-phenylene diisocyanate
   4,4'-diphenylmethane diisocyanate
   2,4-toluene diisocyanate
   3,3'-dimethyl-4,4'-biphenylene diisocyanate
   3,3'-dimethyl-4,4'-diphenylmethane diisocyanate
   2,2', 5,5'-tetramethyl-4,4'-biphenylene diisocyanate
   2,4-/2,6-toluene diisocyanate (80/20)
   3,3'-dimethoxy-4,4'-biphenylene diisocyanate
   4,4'-biphenylene diisocyanate
   3,3'-dichlorobiphenylene diisocyanate
   α, α'-xylene diisocyanate
   vinylene diisocyanate
   polymethylene polyphenylisocyanate B. dianhydrides
   pyromellitic dianhydride
   3,3', 4,4'-benzophenone tetracarboxylic dianhydride
   bis(3,4-dicarboxyphenyl)ether dianhydride
   2,2-bis(3,4-biscarboxyphenyl)propane dianhydride
   1,2,4,5-cyclohexane tetracarboxylic dianhydride The above list is for purposes of illustration only and is not intended to be all inclusive. Other polyisocyanate or anhydride crosslinking reagents may be used as curing agents.

The amount of curing agent will generally vary from 2–50% by weight on polyphosphazene and is determined by the functionality and molecular weight of both the polyphosphazene and the curing agent itself. The preferred ratio of reactive group of curing agent to hydroxyl group of the polyphosphazene is 1.0 to 1.1.

The crosslinking reaction may be performed at ambient or elevated temperatures. For example, a polyphosphazene derived from trifluoroethanol (45 mole percent), 2,2,3,3,4,4,5,5, octafluoropentanol (45 mole percent) and 1,3-butanediol (10 mole percent) when dissolved in tetrahydrofuran can be crosslinked at room temperature in the presence of 2,4-toluene diisocyanate and dibutyltin diacetate catalyst. The same polymer can be crosslinked with dianhydrides but longer times and/or higher temperatures are required. Systems which crosslink slowly are particularly useful for solvent based coatings and solventless sealant and potting compositions.

In these instances, the formulated polymer is applied to the desired substrate or form and subsequently crosslinked in situ upon standing and/or upon application of heat. These crosslinking reactions are often run in the presence of inert, reinforcing or other fillers and the presence of these additives should in no way be construed as falling outside the scope of this invention.

This invention is further illustrated by reference to the following examples which are not intended to limit the scope of the invention.

EXAMPLE 1

Preparation and Cure of a
$[CF_3CH_2C)_2PN-(C_3F_7CH_2O)_2PN-\{CH_3CH(OH)C_2H_4O\}_2PN]_n$ Terpolymer An alkoxide mixture was prepared by the reaction of $CF_3CH_2OH$ (18.0 g, 0.18 mole), $n\text{-}C_3F_7CH_2OH$ (36.0 g, 0.18 mole) and $CH_3CH(OH)C_2H_4CH$ (16.2 g, 0.18 mole) with sodium (10.1 g, 0.44 mole) in 400 ml of dry tetrahydrofuran. The alkoxide mixture was stirred overnight at room temperature and refluxed for 3 hours. The $[Cl_2PN]_n$ polymer (23.2 g, 0.2 mole) in benzene was added to the alkoxide solution at reflux in about 1.5 hours. After the addition was complete the reaction mixture was stirred for 0.5 hour and allowed to cool to room temperature. The liquid was decanted and the solid portion was washed with water. The solid product was dissolved in 600 ml of the azeotrope of $CCl_2FCClF_2$ and acetone and washed with water until the aqueous layer was free of chloride ion. Upon precipitation into benzene, an opaque white rubbery solid (26 g) was obtained. The terpolymer had an intrinsic viscosity of 0.83 dl/g in $CCl_2FCClF_2$/acetone at 28°C. By titration, the $CH_3CH(OH)C_2H_4O-$ concentration of the title terpolymer was found to be about 11 mole percent. Anal. Calcd. for the title terpolymer which contains 10 mole percent of $CH_3CH(OH)CH_2CH_2O-$: C; 22.5; H, 1.6; N, 4.2; Cl, 0.0. Found: C, 22.7; H, 1.7; N, 4.6; Cl, 0.2. The title terpolymer was also prepared with the amount of —OH functionality varying from 0.5 to 35 mole percent by using initial quantities of 0.01 to 0.15 mole, respectively, of $CH_3CH(OH)C_2H_4ONa$ and decreasing the amounts of sodium fluoroalkoxides accordingly.

Separate curing studies with an aliphatic diisocyanate DDI and 2,4-toluene diisocyanate (TDI) were carried out. A 10 percent solution of the above polymer ($[n]=0.83$) was prepared in the azeotrope of $CCl_2FCClF_2$ and acetone, crosslinking agents were added, and the mixture was observed at room temperature. The curing data are summarized in Table 1. In a similar manner the terpolymers of this example were also crosslinked by polymethylene polyphenylisocyanate (PAPI, trademark of Upjohn Co.)

Table 1

Room Temperature Cures of a
[(CF$_3$CH$_2$O)$_2$PN—(C$_3$F$_7$CH$_2$O)$_2$PN— CH$_3$CH(OH)CH$_2$CH$_2$O $_2$PN]$_n$ Terpolymer
Cure Mixture
Terpolymer(0.5g) in solution

| TDI (g) | DDI (g) | Catalyst[a] (microliters) | Time of Observation (hrs.) | Remarks |
|---|---|---|---|---|
| | 0.15 | | 240 | no cure evaporate and heat to 80–90°C for several hours, cured |
| | 0.15 | 15 | 5 | very slight cure |
| | 0.1 | 10 | 5 | very slight cure |
| | 0.2 | 20 | 5 | yellowish color, very slight cure |
| 0.05 | | 5 | 5 | no cure |
| | | | 24 | moderate cure |
| 0.08 | | 8 | 5 | no cure |
| | | | 12 | tight cure |

[a] Dibutyltin diacetate

The polymer of Example 1 was also cured with 3,3′, 4,4′-benzophenone/tetracarboxylic dianhydride by heating at 150°C. The polymer was also cured with 2,4-toluene diisocyanate (TDI) and dibutyltin diacetate catalyst as a coating as follows: a glass sheet was coated with a solution of the polymer and solvent was allowed to evaporate. When the film was slightly tacky, a small amount of a solution of TDI (15% by weight on polymer) and dibutyltin diacetate (0.5% by weight on polymer) was sprayed over it. Further drying led to a crosslinked coating.

EXAMPLES 2 – 12

Following the procedure of Example 1, using the indicated amounts of the alcohols and the indicated reaction conditions, the corresponding coand terpolymers of Examples 2–12 were prepared. When reaction temperatures in excess of 70°C were employed, bis(2-methoxyethyl)ether and chlorobenzene were used as solvents for the alkoxides and [Cl$_2$PN]$_n$ polymer, respectively. The polymers were found to be curable with toluene diisocyanate or the other curing agents listed above.

ran. The sodium hydroxybutoxide was added to a solution of 3.43 g [(CF$_3$CH$_2$O)$_2$PN-(n-C$_3$F$_7$CH$_2$O)$_2$PN]$_n$(1:1) copolymer (0.01 mole) in 70 ml of (F[CF(CF$_3$)CF$_2$C]$_2$CHFCF$_3$)/dioxane (5v/2v). The reaction was stirred overnight at room temperature and then heated 3 hours at 70°C. Polymer was precipitated upon addition of methanol and was isolated as described in Example 1. The product (3.2 g) was a yellowish, weak rubbery solid which had an intrinsic viscosity of 0.80 dl/g in Freon TA at 28°C. The initial copolymer had an intrinsic viscosity of 0.83 dl/g. Analysis of product was essentially the same as that described in Example 1. Crosslinking was effected with 2,4-toluene diisocyanate.

Similarly a terpolymer with an intrinsic viscosity of 0.21 dl/g was prepared. This material was mixed with TDI and dibutyltin diacetate catalyst and poured into an open mold. Upon standing a crosslinked elastomeric mass was produced. This same mixture also served as a sealant material upon crosslinking.

EXAMPLES 14–17

Following the procedure of Example 13, but using

| Example | Alcohol(s) | Moles | Glycol | (Moles) | *Reaction Conditions °C | Hours |
|---|---|---|---|---|---|---|
| 2 | CF$_3$CH$_2$OH | (0.36) | 1,3-butanediol | (0.18) | 70 | 1 |
| 3 | CF$_3$CH$_2$OH | (0.18) | 1,2-propanediol | (0.18) | 70 | 1 |
| | H(CF$_2$)$_4$CH$_2$OH | (0.18) | | | | |
| 4 | CF$_3$CH$_2$OH | (0.18) | | | | |
| | H(CF$_2$)$_6$CH$_2$OH | (0.18) | 1,3-butanediol | (0.20) | 70 | 1 |
| 5 | CF$_3$CH$_2$OH | (0.18) | 2-(m-hydroxy- | | | |
| | CH$_3$OH | (0.18) | phenoxy)-ethanol | (0.10) | 70 | 5 |
| 6 | CF$_3$CH$_2$OH | (0.24) | | | | |
| | C$_6$H$_5$OH | (0.12) | 1,3-butanediol | (0.18) | 70 | 10 |
| 7 | CH$_3$OH | (0.36) | 1,3-butanediol | (0.18) | 70 | 10 |
| 8 | n-C$_5$H$_{11}$OH | (0.36) | 1,3-butanediol | (0.18) | 70 | 24 |
| 9 | CH$_3$CCH$_2$CH$_2$OH | (0.36) | 1,3-butanediol | (0.18) | 70 | 24 |
| 10 | 4-(n-C$_4$H$_9$O)C$_6$H$_4$OH | (0.36) | 2-(m-hydroxyphenoxy)-ethanol | (0.10) | 125 | 30 |
| 11 | 4-ClC$_6$H$_4$OH | (0.36) | " | " | 125 | 30 |
| 12 | C$_6$H$_5$CH$_2$OH | (0.36) | " | " | 70 | 20 |

*Followed by stirring overnight at room temperature.

EXAMPLE 13

Alternate Preparation of the Terpolymer of Example 1

A solution of the sodium salt of 1,3-butanediol was prepared from 1.8 g 1,3-butanediol (0.02 mole) and 0.12 g sodium (0.005 mole) in 20 ml dry tetrahydrofuthe homopolymers and copolymers indicated below, the corresponding hydroxyl containing copolymers and terpolymers, respectively, were obtained. All the products could be crosslinked by reaction with 2,4-toluene diisocyanate.

| Example | Starting Polymer |
|---|---|
| 14 | $[(CF_3CH_2O)_2PN]_n$ |
| 15 | $[(H(CF_2)_2CH_2O)_2PN]_n$ |
| 16 | $[(CF_3CH_2O)_2PN—(H(CF_2)_4CH_2O)_2PN]_n(1:1)$ |
| 17 | $[(CF_3CH_2O)_2PN—(C_6H_5O)_2PN]_n(1:1)$ |

EXAMPLE 18

Preparation of a
$[(CF_3CH_2O)_2PN-\{H(CF_2)_4CH_2O\}_2PN-(HOCH_2CH_2O)_2PN]_n$ Terpolymer A solution prepared from sodium (0.069 g, 0.003 mole) and 100 ml ethylene glycol was added to a refluxing solution (70°C) of $[(CF_3CH_2O)_2PN-(H(CF_2)_4CH_2O)_2PN]_n(1:1)$ copolymer (11.3 g, 0.03 equiv.) in 300 ml tetrahydrofuran. The reaction was refluxed 4-½ hours, cooled and polymer was precipitated. The title terpolymer (6.0 g) was obtained after water washing and drying. A solution of terpolymer in tetrahydrofuran crosslinked upon standing at room temperature in the presence of 2,4-toluene diisocyanate and dibutyltin diacetate catalyst.

EXAMPLES 19-21

Following the procedure of Example 18, using the indicated poly(fluoroalkoxyphosphazene) and glycol, the corresponding curable polymers of examples 19-21 were prepared.

| Example | Starting Polymer | Polymer Prepared | Glycol Used |
|---|---|---|---|
| 19 | $[(CF_3CH_2O)_2PN]_n$ | $[(CF_3CH_2O)_2PN—(HOCH_2CH_2O)_2PN]_n$ | $HOCH_2CH_2OH$ |
| 20 | " | $[(CF_3CH_2O)_2PN—\{HO(CH_2)_4O\}_2PN]_n$ | $HO(CH_2)_4OH$ |
| 21 | $[(CF_3CH_2O)_2PN—(4-ClC_6H_4O)_2PN]_n$ | $[(CF_3CH_2O)_2PN—(4-ClC_6H_4O)_2PN—\{HO(CH_2)_3O\}_2PN]_n$ | $HO(CH_2)_3OH$ |

We claim:

1. Polyphosphazenes having a degree of polymerization of 10 to 50,000 the skeletal chains of which comprise randomly repeating units represented by the general formulas

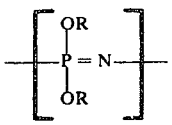 and 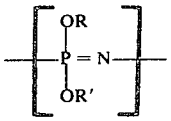

wherein each R is a monovalent radical selected from the group consisting of alkyl, substituted alkyl, fluoroalkyl, aryl, substituted aryl and arylalkyl and not every R in the polyphosphazene is required to be identical to every other R; and each R' is a monovalent group containing OH functionality and the ratio of R':R being between 0.5 to 99.5 and 35 to 65.

2. The polymers of claim 1 wherein R' is represented by the general formula

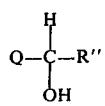

in which Q is selected from the group consisting of $—(CH_2)_{\overline{n}}$ and $—C_6H_4X(CH_2)_{\overline{m}}$ wherein the $—X(CH_2)_{\overline{m}}$ group is meta or para, $n$ is an integer from 1 to 6, $m$ is an integer from 1 to 3, X is O or $CH_2$, and R'' is selected from the group consisting of H and alkyl with up to four carbon atoms.

3. A terpolymer according to claim 1 in which the randomly repeating units bonded to phosphorus comprise $CF_3CH_2O—$; $C_3F_7CH_2O—$ and

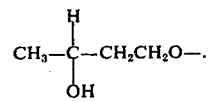

4. The polymers of claim 1 as curable compositions which can be crosslinked at room temperature or above.

5. A cured polyphosphazene of claim 1, cured with a polyisocyanate.

6. A cured polyphosphazene of claim 1, cured with a polyanhydride.

7. The polyphosphazenes of claim 1 in which R is $CF_3CH_2—$.

8. The polyphosphazenes of claim 1 in which R is selected from the group which is comprised of $—CH_2(CF_2)_{\overline{m}}F$ and $—CH_2(CF_2)_pH$ groups where $m$ and $p$ are integers from 1 to 8.

9. The polyphosphazenes of claim 1 in which up to 35 mole percent of the groups attached to the P atoms contain —OH functionality.

10. A process for the preparation of the polymers of claim 1 which comprises the reaction of poly(dichlorophosphazene) with the alkali salt or salts of ROH and the alkali salt of

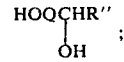

R, Q, and R'' being as defined in claims 1 and 2.

11. A process for the preparation of soluble polymers of claim 1 which comprises the reaction of a polymer which contains the units

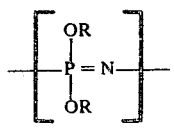

where not every R is required to be identical to every other R with the alkali salt of
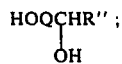
R, Q, and R'' being as defined in claims 1 and 2.
* * * * *